(12) United States Patent
Vollert et al.

(10) Patent No.: US 8,448,757 B2
(45) Date of Patent: May 28, 2013

(54) ELECTROMECHANICAL FRICTION BRAKE

(75) Inventors: Herbert Vollert, Vaihingen/Enz (DE);
Chi-Thuan Cao, Korntal-Muenchingen (DE); Nguyet-Minh Cao, legal representative, Korntal-Muenchingen (DE); Bertram Foitzik, Ilsfeld (DE); Willi Nagel, Remseck/Hochdorf (DE); Bernd Goetzelmann, Rutesheim (DE); Dirk Hofmann, Knor-Pod Cvilinem (CZ)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 12/744,103

(22) PCT Filed: Nov. 14, 2008

(86) PCT No.: PCT/EP2008/065589
§ 371 (c)(1),
(2), (4) Date: May 21, 2010

(87) PCT Pub. No.: WO2009/065781
PCT Pub. Date: May 28, 2009

(65) Prior Publication Data
US 2010/0243387 A1    Sep. 30, 2010

(30) Foreign Application Priority Data
Nov. 21, 2007   (DE) .................. 10 2007 055 637

(51) Int. Cl.
*F16D 65/21* (2006.01)
*F16D 65/52* (2006.01)
*F16D 55/22* (2006.01)

(52) U.S. Cl.
USPC ........ 188/156; 188/72.1; 188/72.2; 188/72.7; 188/72.8; 188/72.9; 188/162; 188/196 B; 188/196 D

(58) Field of Classification Search
USPC ................ 188/176, 156, 71.2, 157–158, 265, 188/72.2, 72.7–72.8, 72.1, 71.3, 162, 163, 188/106 F, 196 F, 71.9, 106 P, 196 D, 153 R, 188/196 B, 71.4, 73.1, 171
See application file for complete search history.

(56) References Cited

U.S. PATENT DOCUMENTS

| | | | |
|---|---|---|---|
| 6,082,504 A * | 7/2000 | Organek et al. ............. | 188/72.7 |
| 6,138,801 A * | 10/2000 | Shirai et al. .................. | 188/157 |
| 6,173,820 B1 | 1/2001 | Blosch et al. | |
| 6,311,807 B1 * | 11/2001 | Rinsma ........................ | 188/71.9 |
| 6,988,596 B2 * | 1/2006 | Gerard et al. ................ | 188/72.8 |
| 2003/0066719 A1 * | 4/2003 | Watanabe et al. ............ | 188/72.7 |
| 2005/0139436 A1 * | 6/2005 | Baumann et al. ............ | 188/72.2 |

FOREIGN PATENT DOCUMENTS

| | | |
|---|---|---|
| DE | 19621533 A1 | 12/1997 |
| DE | 102006012440 A1 | 9/2007 |
| WO | 9719275 A1 | 5/1997 |

* cited by examiner

Primary Examiner — Robert A Siconolfi
Assistant Examiner — San Aung
(74) Attorney, Agent, or Firm — Maginot, Moore & Beck

(57) ABSTRACT

The invention relates to an electromechanical friction brake, for example in the form of a disc brake having an electromechanical actuation device. The electric motor of the actuation device presses a frictional brake lining against a brake disc by means of a reduction gearbox and a ball ramp mechanism. The actuation device is supported by a spring washer that is pretensioned so strongly that when the disc brake is released it acts on a segment with a falling spring characteristic; that is, a spring force exerted by the spring washer on the frictional brake lining increases with increasing tension of the disc brake.

18 Claims, 2 Drawing Sheets

ELECTROMECHANICAL FRICTION BRAKE

CROSS-REFERENCE TO RELATED APPLICATION

This application is a 35 USC 371 application of PCT/EP2008/065589 filed on Nov. 14, 2008.

BACKGROUND OF THE INVENTION

1. Field of the Invention

The invention relates to an electromechanical friction brake. The friction brake is intended in particular as a wheel brake for a motor vehicle. The term "electromechanical" means that it has an electromechanical actuating device, for instance with an electric motor and gear for its actuation, or in other words for pressing a friction brake lining against a brake body that is to be braked. The actuation of a brake is also called tightening. In the case of a disk brake, the brake body is a brake disk; in the case of a drum brake, the brake body is a brake drum. The invention is not limited to the disk or drum brake forms mentioned, but instead can be realized in principle in arbitrary forms of brakes. Although the invention is described below in terms of a disk brake, it is not limited to that type of brake.

2. Description of the Prior Art

From German Patent Disclosure DE 196 81 658 T1, one such friction brake is known, as a wheel brake for a motor vehicle. The known friction brake is embodied as a disk brake. As its actuating device, it selectively has an electromagnet or a linear motor, with which a friction brake lining can be pressed against a brake disk that forms a brake body to be braked. The actuating device is reinforced by a cup spring, which likewise acts on the friction brake lining in the direction of pressing against the brake body, or in other words in the direction of an actuation of the brake. Hence the actuating device needs to exert only a portion of the tightening force for pressing the friction brake lining against the brake body; the remainder of the tightening force is a spring force exerted by the cup spring. A smaller, lighter-weight and less-powerful electromechanical actuating device suffices.

The known friction brake does not have a normal cup spring but instead has a special cup spring, which has no linear characteristic spring curve; instead, its characteristic spring curve initially rises and then after a maximum drops again. After a minimum, which typically located near a zero spring force and may be positive or negative, the characteristic spring curve of the special cup spring typically rises again. If the minimum of the characteristic spring curve is negative, this means a negative spring force; that is, the direction of the spring force reverses itself. A special feature of the special cup spring is accordingly that its characteristic spring curve has a dropping portion. Conversely, in springs with a linear characteristic spring curve, the spring force, in the portion in which the characteristic spring curve drops, decreases with increasing deformation of the cup spring. In other words, the spring force of the cup spring rises with decreasing deformation, in the range in which its characteristic spring curve drops. The deformation, which can also be called deflection, means a flattening of the cup spring, which in the unloaded state is conical or curved. The deformation can continue to the point of a flat disk, or even beyond. The latter means that the cup spring is as it were inverted; that is, its curvature is reversed.

The known friction brake makes use of the special feature that the special cup spring used has a characteristic spring curve with a dropping portion. The cup spring is used in the region of its dropping characteristic spring curve; with the friction brake released, it is deformed to such an extent that its characteristic spring curve is in the range of the minimum. Upon actuation or tightening of the friction brake, the deformation of the cup spring decreases; the spring force increases, because of the characteristic spring curve that is dropping and that has moved in the negative direction. With increasing tightening of the friction brake, the spring force exerted by the cup spring on the friction brake lining thus increases, and as a result, a large proportion of the tightening force can be exerted by the cup spring. The proportion of the tightening force to be exerted by the actuating device is as a result low over the entire actuation and tightening force range.

The invention is not especially limited to a cup spring; instead, a spring element can in general be used whose characteristic spring curve drops at least over one portion. The spring element acts parallel to the actuating device; that is, the force of the actuating device and the force of the spring element are added together.

ADVANTAGES AND SUMMARY OF THE INVENTION

Like the known friction brake, the friction brake of the invention also has a spring element with a characteristic spring curve that (in some portions) drops and that acts parallel to an actuating device of the friction brake, or in other words urges the friction brake lining in the direction of a brake actuation. Because of the dropping characteristic spring curve, a spring force exerted by the spring element on the friction brake lining increases with increasing tightening of the friction brake. An electric motor and a gear are accordingly relieved.

The friction brake of the invention is electromechanical; it has an electromechanical actuating device with an electric motor. It can have a gear, in particular a step-down gear. For converting a rotating driving motion of the electric motor into a translational motion for pressing the friction brake lining against the brake body, the friction brake of the invention has a ramp mechanism.

Ball ramp mechanisms are known that have two coaxially disposed disks, between which balls—typically three balls, for the sake of static certainty—are distributed in the circumferential direction. One of the two disks can be driven to rotate. On or in facing end faces, the disks have ramps extending in the circumferential direction, which rises in one circumferential direction and in which the balls roll. The ramps are typically groovelike indentations, which become lower in one circumferential direction.

By rotation of the one disk, the balls roll in the rising direction of the ramps and force the disks apart, thereby generating the translational motion. In the opposite direction of rotation, the two disks approach one another. Instead of balls, still other roller bodies can be employed, such as cylindrical or conical rollers. These rollers can be supported rotatably on one disk, so that only the other disk has ramps on which the rollers or other roller bodies roll. A ramp mechanism without roller bodies is also conceivable, which has one or more circumferentially extending ramps that by rotation press down on a counterpart body and thereby generate a translational motion as in the known ball ramp mechanism.

Advantageously, but not necessarily, the ramp mechanism of the friction brake of the invention has roller bodies, such as balls or rollers as roller bodies, and forms a rolling, ball or roller ramp mechanism. The ramp mechanism, at least if it has roller bodies, has the advantage of low friction. A further advantage of the ramp mechanism is that the slope of the ramps can vary over their length. By means of an initially great slope, an air clearance, that is, a gap between the friction brake lining and the brake body with the friction brake released, can rapidly be overcome. By a decreasing slope, with increasing tightening of the friction brake, a greater force boost, and thus at limited drive torque great force, can be attained. A further advantage of a ramp mechanism is the possibility of a parking brake by means of an indentation in the ramps of the ramp mechanism after a rise. If the balls or roller bodies get into the indentation, the ramp mechanism remains on its own in that rotary position, and keeps the friction brake tightened when the electric motor is without current.

One aspect of the invention advantageously provides for a wear readjustment. To that end, the ramp mechanism has a rotary angle limitation in a direction of rotation that corresponds to the release direction of the friction brake. The rotary angle limitation may be formed by a stop on an end of the ramps. As a result, the ramp mechanism cannot be rotated in reverse any farther than up to the release of the friction brake. Moreover, the friction brake has a clutch, which in a rotary actuation direction transmits a torque that suffices to tighten the friction brake up to the maximum tightening force. In the opposed reverse or release direction of rotation, the torque transmitted by the clutch is limited. Examples of such a clutch are a slip clutch or a directionally switched clutch, that is, a so-called freewheel. The spring element of the friction brake can be a component of the slip clutch. For wear adjustment, the friction brake furthermore has a helical gear, which upon a rotation of the clutch inlet relative to the clutch outlet is adjusted in the direction of positioning the friction brake toward the brake body. The wear adjustment is effected because the ramp mechanism, with the friction brake released, is urged in the release direction by a torque. Because of the rotary angle limitation, the inlet and outlet of the ramp mechanism do not rotate counter to one another; instead, the clutch inlet and clutch outlet do so. As a result, the helical gear is adjusted, positioning of the friction brake toward the brake body is effected, and the spacing of the friction brake lining from the brake body, or in other words the air clearance, is reduced.

If a thickness of the friction brake lining is decreased by wear, then a spring travel decreases because of the elasticity of the friction brake lining. For compensation, another aspect of the invention contemplates a spring elasticity of the helical gear. If for wear compensation the helical gear is adjusted in the direction of a positioning of the friction brake lining toward the brake body, then a length of the helical gear increases, and thus its spring length or spring elasticity increases. The shortened spring travel resulting from wear of the friction brake lining is thus compensated for, and the compensation can be complete or partial, or overcompensation can take place.

Another aspect of the invention, contemplates a second spring element with a characteristic spring curve that drops (in some portions) and counteracts the spring element hereinafter also called the first spring element. As the second spring element, once again in principle any spring element with a characteristic spring curve that drops at least in some portions can be employed, and in particular again a special cup spring. The first spring element urges the friction brake lining directly or indirectly in the direction of an actuation of the friction brake; it is more prestressed when the friction brake is released than when the friction brake is actuated. Because of the dropping characteristic spring curve, the spring force of the first spring element rises upon actuation of the friction brake. The second spring element acts counter to the first spring element, or in other words in the direction of a release of the friction brake. With the friction brake released, the second spring element is not prestressed as much as with the friction brake actuated; because of the dropping characteristic spring curve, the spring force of the second spring element drops upon actuation of the friction brake. The two spring elements are designed in such a way, and overall the disposition of the spring elements is designed in such a way, that with the friction brake released, the resultant spring force of the two spring elements is virtually zero; a low, negative resultant spring force, that is, a spring force acting in the direction of a release of the friction brake by itself, that is, without the action of its actuating device, keeps the released friction brake in the released position and therefore preferred. When the friction brake is actuated, the resultant spring force of both spring elements is positive; that is, the actuation of the friction brake is reinforced by the two spring elements. Depending on the design of the two spring elements and the structural design of the friction brake, the resultant spring force can be approximately constant, or it can increase. By means of a resultant spring force that increases with increasing tightening, a major proportion of the tightening force is exerted by both spring elements even at a high tightening force. In principle, a decreasing spring force is also possible, although this might not be practical. By the inventive combination of two spring elements with a dropping characteristic spring curve, the resultant characteristic spring curve of the two spring elements and the resultant spring force acting on the friction brake lining can be varied. Moreover, a resultant spring force that is negative when the friction brake is released, or in other words that acts in the direction of a release of the friction brake, is possible, which exerts an initial tension on moving parts of the friction brake and avoids flapping when the friction brake is released. A spring element with a dropping characteristic spring curve should be understood to be a spring element with a characteristic spring curve that drops at least in some portions and that is used in the portion of its dropping characteristic spring curve.

In order to step a spring travel of the spring element that has the dropping characteristic spring curve up or down, one embodiment of the invention contemplates a gear by way of which the spring element with the dropping characteristic spring curve engages the friction brake lining. In a refinement in accordance to the invention, the gear has a varying gear ratio. Examples of such gears are lever mechanisms, in particular toggle lever mechanisms, or a ramp mechanism.

BRIEF DESCRIPTION OF THE DRAWINGS

Further characteristics of the invention will become apparent from the ensuing description of embodiments of the invention in conjunction with the drawings, in which.

The drawings are to be understood as simplified, schematic illustrations, not to scale, for the sake of comprehension and explanation of the invention.

DESCRIPTION OF THE PREFERRED EMBODIMENT

Figure 1:
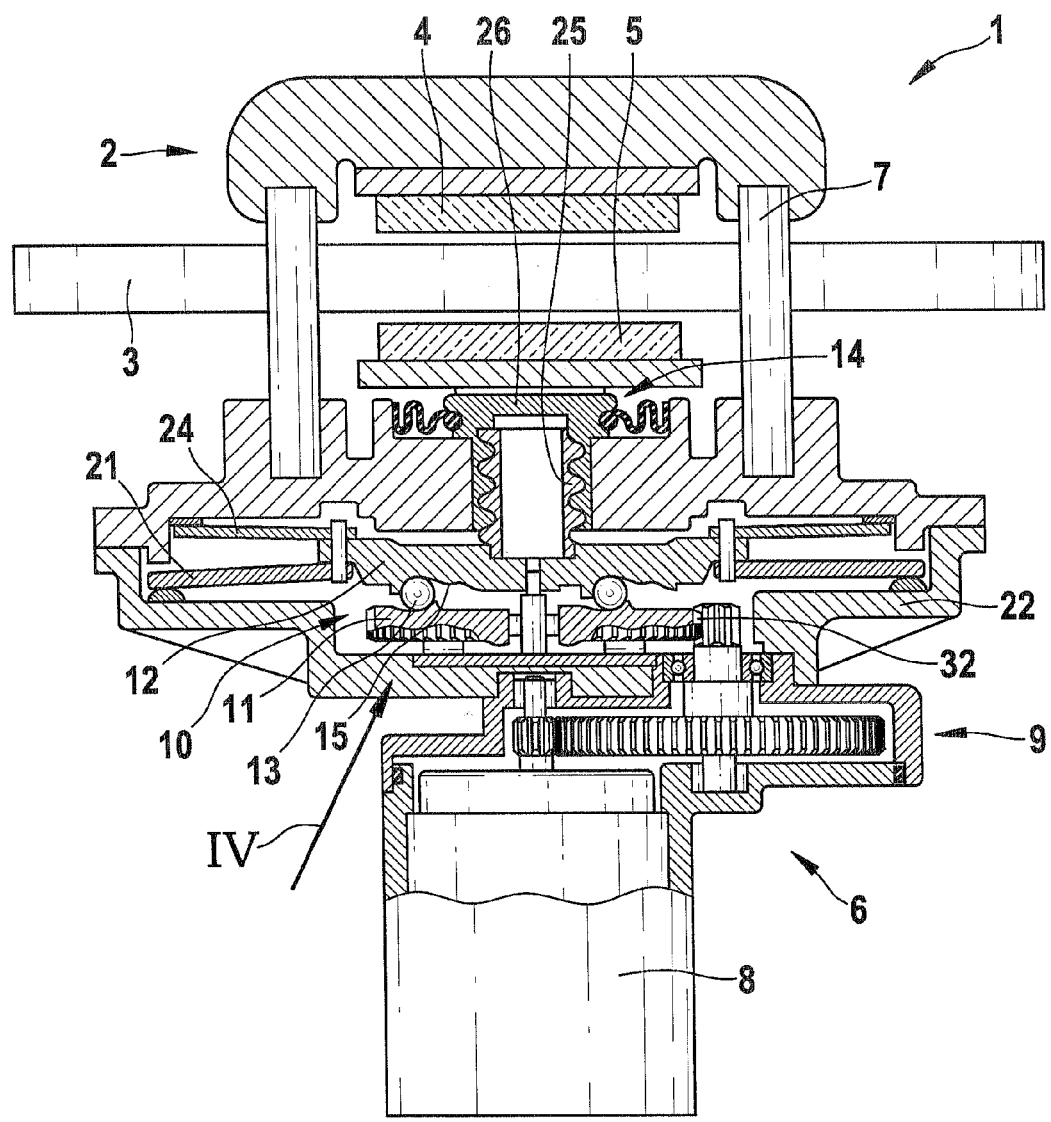
FIG. 1 shows a first exemplary embodiment of a friction brake of the invention, in the form of a disk brake, looking radially from outside onto a brake disk in section along a secant plane to the brake disk.

The friction brake according to the invention, shown in FIG. 1, is embodied as a disk brake 1. It has a brake caliper 2, in which two friction brake linings 4, 5 are disposed, one on either side of a brake disk 3. One of the two friction brake linings 4 is disposed fixedly in the brake caliper 2; the other friction brake lining 5 can be pressed for actuation, that is for tightening the disk brake 1, against the brake disk 3 by an electromechanical actuating device 6. The actuating device 6 is disposed on the same side of the brake disk 3 as the movable friction brake lining 5. Both friction brake linings 4, 5 are braced in the circumferential direction of the brake disk 3 in a manner known per se in a brake holder, which is not shown here for the sake of clarity in the drawing. The brake holder, in a manner known per se, guides the brake caliper 2 transversely displaceably to the brake disk 3 on guide bolts 7. When the movable friction brake lining 5 is pressed against the brake disk 3, the brake caliper 2 is displaced transversely to the brake disk 3 and presses the fixed friction brake lining 4 against the other side of the brake disk 3, which is braked as a result. This is known per se. The brake disk 3 forms a brake body that is to be braked.

The actuating device 6 has an electric motor 8 which, via a step-down gear 9 and a ramp mechanism 10 that is to be explained further hereinafter, presses the movable friction brake lining 5 against the brake disk 3. In the exemplary embodiment shown, the step-down gear 9 is a two-stage gear train with spur gears.

The ramp mechanism 10 has two coaxially disposed, essentially circular disks 11, 12, which are rotatable counter to one another. One disk 11 has a set of teeth 32 on its outer circumference; thus it simultaneously forms both a face edge and last gear wheel of the gear train of the step-down gear 9. Instead of a spur gearing, the disk 11 may also be embodied as a plate wheel or cone wheel (not shown), so that the last stage of the step-down gear 9 forms a right-angle gear (not shown). As a result, a disposition of the electric motor 8 parallel to the brake disk 3 is possible, instead of with an axis perpendicular to the brake disk 3 as shown in the exemplary embodiment. This makes a more-compact structure of the brake caliper 2 possible. Also by means of a worm gear, whose worm engages the set of teeth 32 on the circumference of the disk 11 of the ramp mechanism 10, a disposition of the electric motor 8 parallel to the brake disk 3 is possible (not shown).

The disk 11 will hereinafter also be called the driving disk or in short the drive of the ball ramp mechanism 10 and is always identified by the same reference numeral 11. The other disk 12 of the ramp mechanism 10 will hereinafter also be called the driven disk or the power takeoff of the ball ramp mechanism 10 and always has the reference numeral 12. Both disks 11, 12, on their facing end faces, have grooves that extend over a limited angle in the circumferential direction. The grooves form ball races or ramps 15, in which balls 13, as roller bodies, roll. Thus the ramp mechanism 10 is a ball ramp mechanism. Instead of balls 13, the ramp mechanism may also have other roller bodies, such as cylindrical or conical rollers, or it may be embodied as a sliding mechanism (not shown) instead of as a rolling mechanism. A depth of the grooves that form the ball races decreases in one circumferential direction of the disks 11, 12; that is, the ball races have a slope in a circumferential direction of the disks 11, 12. Three ball races distributed over the circumference are provided, so that the disks 11, 12 are braced with three balls 13 and thus in a statically certain manner. By means of a rotation of the driving disk 11 relative to the driven disk 12, the balls 13 roll in the ball races and, because of the slope of the ball races, force the disks 11, 12 apart. By rotation of the driving disk 11, the driven disk 12 is displaced translationally in the axial direction. Via a helical gear 14, to be described hereinafter, the driven disk 12 of the ramp mechanism 10 presses the movable friction brake lining 5 against the brake disk 3.

Figure 2:
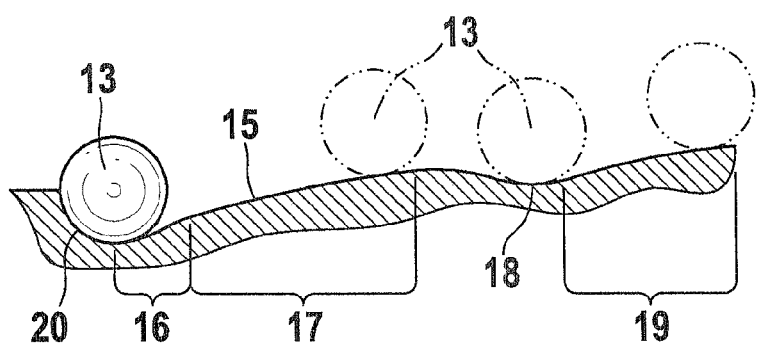
FIG. 2 shows a slope of a ramp of a ramp mechanism of the friction brake of FIG. 1.

The slope of the ball races, hereinafter also called ramps 15, in the disks 11, 12 of the ramp mechanism 10 is not constant; instead, it has the course shown in FIG. 2. At the beginning, the ramps 15 have a great slope over a short portion 16, so that an air clearance, that is, a gap between the friction brake linings 4, 5 and the brake disk 3, is rapidly overcome. Next, the ball races 15 have a portion 17 of decreasing slope. In this portion 17, the friction brake linings 4, 5 contact the brake disk 3, and the tightening and braking force is increased by rotation of the driving disk 11 in the tightening direction. The decreasing slope in the portion 17 of the ramps 15 brings about an increase in the force boost, so that a high tightening and braking force can be achieved. The tightening force is the force with which the movable friction brake lining 5 is pressed against the brake disk 3.

After the portion 17 having the decreasing slope, the ramps 15 have an indentation 18. If the disk brake 1 is tightened so much that the balls 13 get into the indentations 18 of the ramps 15, then the ramp mechanism 10 automatically remains in that position; the disk brake 1 remains tightened without the aid of the electric motor 8. This is the so-called parking brake position of the disk brake 1, in which the disk brake 1 maintains the braking force without being supplied with current.

Over a portion 19 adjoining the indentation 18, the ramps 15 rise again. The tightening and braking force can be further increased as a result. This portion 19 is provided for wheel brakes of a rear axle of a motor vehicle to enable increasing the braking force even more while the vehicle is driven in reverse. The reason for this is that with braking while driving in reverse, there is an additional load on the rear axle, and thus a greater braking force is possible and may be necessary. Otherwise, the ramps 15 may also end with the indentation 18. In the event that no parking brake function is desired, the indentation 18 may be omitted. The portion 17 in which the slope of the ball races 15 decreases is utilized for typical service braking operations.

In the release direction, a rotary angle of the disks 11, 12 of the ramp mechanism 10 is limited. The rotary angle limitation is effected by means of a stop 20, which is formed by the depth and shape of the grooves, forming the ramps 15, at the beginning of the ramps 15 in the disks 11, 12. The stop that limits the rotary angle of the disks 11, 12 in the release direction can also be realized in some other way; for instance, both disks 11, 12 may have lugs that abut one another (not shown) upon reverse rotation of the disks 11, 12. Thus in the reverse direction of rotation, that is, in the release direction of the disk brake 1, the disks 11, 12 can rotate back counter to one another only as far as their outset position.

Figure 3:
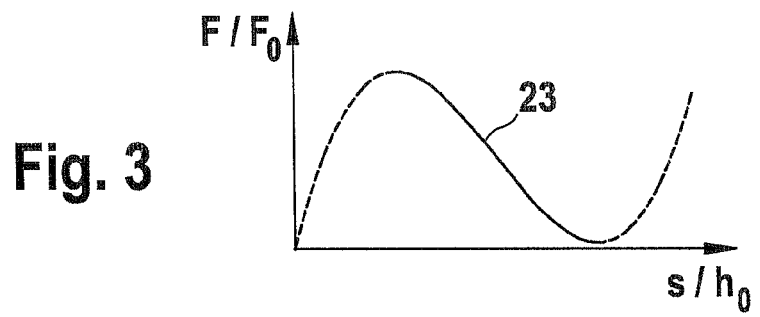
FIG. 3 shows a characteristic spring curve of a spring element of the friction brake of FIG. 1.

The driven disk 12 of the ramp mechanism 10 is urged by a cup spring 21 in the direction of the brake disk 3, or in other words in the direction of tightening of the disk brake 1. The cup spring 21 is braced in a housing 22 of the brake caliper 2 in which the step-down gear 9 and the ramp mechanism 10 are accommodated as well. It is a special cup spring 21, which has no linear characteristic spring curve; its characteristic spring curve 23 is shown in a graph in FIG. 3. The relative spring force $F/F_0$ is plotted on the ordinate; on the abscissa, the deformation s of the cup spring is plotted in relation to the height $h_0$ of the cup spring 21 when it is undeformed. The characteristic spring curve rises up to a maximum and then drops to a minimum, from which point it rises again. At the minimum of the characteristic spring curve, the spring force is approximately zero. At the minimum, the characteristic spring curve of the cup spring 21 can have a low positive or negative value. Negative means that the spring force is operative in the opposite direction. The deformation s of the cup spring 21 means that the spring becomes increasingly flattened. It reaches a flat disk shape on the dropping portion of the characteristic spring curve 23 somewhat before the minimum. Upon further deformation, the cup spring 21 is as it were inverted and curves in the opposite direction.

In the disk brake 1 of the invention, when the disk brake 1 is released the cup spring 21 is prestressed such that it is located approximately at the minimum of the characteristic spring curve 23. Upon tightening of the disk brake 1, the deformation of the cup spring 21 decreases; that is, it curves more markedly in the direction of its relaxed state. Upon maximal tightening of the disk brake 1, the deformation of the cup spring 21 decreases until it is in the range of the maximum of the characteristic spring curve 23. Thus the cup spring 21 is used in the portion of its characteristic curve 23 in which the characteristic curve 23 drops. In the graph in FIG. 3, the portion used of the characteristic spring curve is drawn with a solid line; outside the portion used, the characteristic spring curve is drawn with dashed lines. Upon tightening, the characteristic spring curve is drawn through from minimum to maximum, or from right to left in the graph. The deformation, which can also be called deflection, decreases, which means that with the disk brake 1 released, the nearly flattened cup spring 21 upon tightening curves in the direction of its relaxed shape. That also means that the spring force exerted by the cup spring 21 on the movable friction brake lining 5 rises with increasing tightening of the disk brake 1, instead of decreasing as in spring elements with a rising characteristic spring curve. With increasing tightening of the disk brake 1, the portion of the tightening force exerted by the cup spring 21 with which the movable brake lining 5 is pressed against the brake disk 3 thus rises. The electromechanical actuating device 6, including the step-down gear 9 and the ramp mechanism 10, are correspondingly less loaded; the electric motor 8 needs to exert only a portion of the tightening force necessary for brake actuation and can accordingly be made smaller, lighter in weight, and less powerful. The step-down gear 9 too can be designed for a suitably lesser torque. Overall, the cup spring 21, which according to the invention is used in the dropping portion of its characteristic spring curve 23, can be conceived of as a spring element with a characteristic spring curve that (in some portions) drops.

What is hereinafter called the first cup spring 21 acts counter to a second cup spring 24, which engages the opposite side of the driven plate 12 of the ramp mechanism 10 and which is likewise braced in the housing 22 of the brake caliper 2. The second cup spring 24 is likewise a special cup spring 24, with a characteristic spring curve corresponding to FIG. 3 with a dropping portion, and which is used in the dropping portion of its characteristic spring curve. Since the second cup spring 24 is disposed conversely to the first cup spring 21, the second cup spring 24 becomes more severely deformed upon tightening of the disk brake 1; it traverses the characteristic spring curve from maximum to minimum, or in other words from left to right, whereupon its spring force decreases. While the spring force of the first cup spring 21 increases upon tightening of the disk brake 1, the contrary spring force of the second cup spring 24 decreases upon tightening of the disk brake 1. With the disk brake 1 released, the second cup spring 24 compensates for the spring force of the first cup spring 21, which with the disk brake 1 released is in the range of its minimal spring force. As a result, without the action of the actuating device 6 or in other words with the electric motor 8 currentless, the disk brake 1 remains in the released position. With the disk brake 1 released, the spring force of the second cup spring 24, which acts in the direction of release of the disk brake 1, can also be somewhat greater than the spring force of the first cup spring 21, which acts in the direction of tightening of the disk brake 1. As a result, the two cup springs 21, 24 keep the disk brake 1 released with little prestressing, and they avoid flapping noises. With the disk brake 1 actuated, the spring force of the first cup spring 21 is greater than the contrary spring force of the second cup spring 24, so that there is a resultant spring force which exerts the desired, described tightening force on the movable friction brake lining 5. Since the first cup spring 21 and the resultant spring force of the two cup springs 21, 24 bring to bear a portion of the tightening force of the disk brake 1, the actuating device 6 is correspondingly relieved. Depending on the design, the resultant spring force of the two cup springs 21, 24 may make up a large proportion of the tightening force of the disk brake 1. In the parking brake position of the disk brake 1, in which the balls 13 of the ramp mechanism 10 are located in the indentations 18 in the ramps 15, the step-down gear 9 is load-free. Its gear wheels and/or the set of teeth 32 of the disk 11 can therefore be made of plastic.

As already noted, the driven disk 12 of the ramp mechanism 10 acts on the movable friction brake lining 5 via the helical gear 14. A spindle 25 and a nut 26 of the helical gear 14 are sleeve-shaped and thin-walled and as a result have a spring elasticity.

A tubular nut 26, on the face end of which the friction brake lining 5 is disposed, is engagement with the spindle 25. The helical gear 14 serves the purpose of wear readjustment upon wear of the friction brake linings 4, 5. It is adjusted in the direction of a positioning of the friction brake lining 5 toward the brake disk 3, in order to compensate for wear of the brake linings 4, 5. Upon this adjustment, a free length, protruding from the nut 26, of the spindle 25 becomes greater, and as a result a spring travel increases because of the spring elasticity of the sleevelike and undulating spindle 25. As a result, at least partial compensation is provided for the fact that a spring elasticity of the friction brake linings 4, 5 becomes less when the thickness decreases from wear.

The adjustment of the helical gear 14 is effected in that the drive plate 11 of the ramp mechanism 10 is urged in the release direction by the electric motor 8, when the disk brake 1 is released. The stop 20 of the ramps 15 that forms the rotary angle limitation prevents a rotation of the two disks 11, 12 of the ramp mechanism 10 counter to one another. The driven disk 12 moves in the release direction along with the drive disk 11, whereupon the spindle 25 rotates in the nut 26 of the helical gear 14, and the helical gear 14 is adjusted as described in the direction of a positioning of the friction brake lining 5 toward the brake disk 3. As a result, the compensation for wear is accomplished.

The two cup springs 21, 24, located in the housing 22 of the brake caliper 2 and contacting the driven disk 12 of the ramp mechanism 10 form a slip coupling, which allow the described rotation of the driven disk 12 of the ramp mechanism 10 past the release position in the release direction. In the tightening direction, and when the two disks 11, 12 of the ramp mechanism 10 are not resting on their rotary angle limitation 20, the two cup springs 21, 24 that form the slip coupling keep the driven plate 12 fixed against relative rotation.

Figure 4:
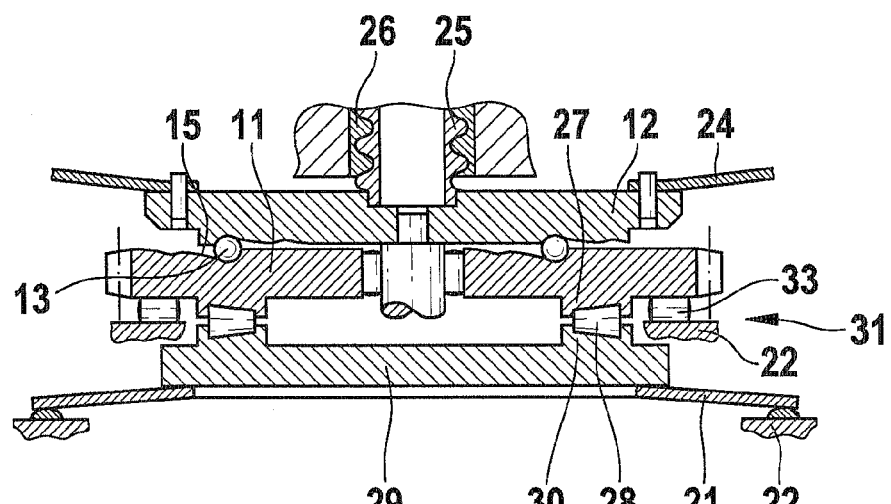
FIG. 4 shows a detail indicated by the arrow IV in FIG. 1 of a modified embodiment of the invention.

In the modified embodiment in FIG. 4, the drive disk 11 of the ramp mechanism 10 also has ramps 27 on its face end remote from the driven plate 12, and roller bodies, in the exemplary embodiment conical rollers 28, roll on these ramps. On the side of the drive disk 11 remote from the driven disk 12, a plate, here called a pressure plate 29, is disposed which also has ramps 30, on which the conical rollers 28 roll. Thus the modification according to FIG. 4 has a second ramp mechanism 31. The pressure plate 29 is rotatable with an axial bearing 33 and is supported axially fixedly in the housing 22 of the brake caliper 2. The first cup spring 21 does not engage the driven plate 12 but instead engages the pressure plate 29. For actuation of the disk brake 1, as in FIG. 1, the drive disk 11 of the first ramp mechanism 10 is driven to rotate by the electromechanical actuating device 6. In the process, the drive disk, supported rotatably and axially fixedly in the housing 22 of the brake caliper 2, does not move axially but instead, via the second ramp mechanism 31, it moves the pressure plate 29 in the axial direction. In that process, the pressure plate 29, depending on the direction of the slope of the second ramp mechanism 31, either tightens or loosens the first cup spring 21 engaging it. Via the second ramp mechanism 31, the first cup spring 21 exerts a moment on the drive disk 11, which acts in the direction of tightening of the disk brake 1 and reinforces the tightening of the disk brake 1 as described in conjunction with FIG. 1. The first cup spring 21 can be used in FIG. 4 in the rising portion of its characteristic spring curve. If it is used as in FIG. 1 in the dropping portion of its characteristic spring curve, the slope of the second ramp mechanism 31 is reversed, so that the pressure plate 29, on tightening of the disk brake 1, is displaced axially in the direction toward the brake disk. In every case, the spring force of the first cup spring 21 increases upon tightening of the disk brake 1. The second ramp mechanism 31 forms a gear by way of which the first cup spring 21 subjects the drive plate 11 to a moment and acts indirectly on the friction brake lining 5 via the first ramp mechanism 10. With the first ramp mechanism 31, a step-up or step-down of a spring travel and of the spring force of the first cup spring 21 is achieved, so that an adaptation of the spring properties of the cup spring 21, which is used in the portion of its dropping characteristic spring curve, to the given conditions and requirements of the disk brake 1 is possible. Since the ramps 27, 30 of the second ramp mechanism 31 can have a slope that varies over the length of the ramps 27, 30, it is possible with the second ramp mechanism 31 to realize a gear of varying gear ratio. As a result, manifold possibilities for adaptation of the properties of the first cup spring 21 to the given conditions and requirements of the disk brake 1 are possible.

The foregoing relates to the preferred exemplary embodiment of the invention, it being understood that other variants and embodiments thereof are possible within the spirit and scope of the invention, the latter being defined by the appended claims.

The invention claimed is:

1. An electromechanical friction brake, comprising:
an electromechanical actuating device;
a friction brake lining configured to be pressed by the actuating device against a brake body to be braked so as to actuate the friction brake; and
a first spring element configured to exert a force parallel to the actuating device to urge the friction brake lining in a direction of a brake actuation,
wherein the first spring element is further configured such that the force exerted by the first spring element increases as the friction brake lining moves in the direction of the brake actuation, and
wherein the actuating device has an electric motor and a ramp mechanism, the ramp mechanism being configured to convert a rotational drive motion of the electric motor into a translational motion for pressing the friction brake lining against the brake body.

2. The friction brake as defined by claim 1, wherein the ramp mechanism has roller bodies.

3. The friction brake as defined by claim 1, wherein the ramp mechanism, beginning in an outset position with the friction brake released, initially has a major slope for overcoming an air clearance between the friction brake lining and the brake body.

4. The friction brake as defined by claim 1, wherein the ramp mechanism has a slope that decreases, when the friction brake lining is contacting the brake body, with increasing tightening of the friction brake.

5. The friction brake as defined by claim 1, wherein the ramp mechanism, after a rise, has an indentation for fixing the friction brake in a parking brake position.

6. The friction brake as defined by claim 5, wherein the ramp mechanism, after the indentation, has a further rise.

7. The friction brake as defined by claim 1, wherein the ramp mechanism has a set of teeth which is driven to rotate by the electric motor.

8. The friction brake as defined by claim 1, wherein the ramp mechanism has a rotary angle limitation in one direction, which limits a reverse rotary angle upon release of the friction brake, the friction brake has a clutch which in one rotary actuation direction transmits a torque sufficient for tightening the friction brake and in an opposite rotary release direction, upon overcoming a limited torque, allows a rotation between a clutch inlet and a clutch outlet, and the friction brake has a helical gear, by way of which the actuating device presses the friction brake lining against the brake body and which upon a rotation of the clutch inlet relative to the clutch outlet is adjusted in a direction of a positioning of the friction brake lining toward the brake body.

9. The friction brake as defined by claim 8, wherein the helical gear has a spring elasticity, which becomes softer upon an adjustment in the direction of a positioning.

10. The friction brake as defined by claim 1, wherein:
the friction brake has a second spring element configured to exert a force parallel to the actuating device to urge the friction brake lining in a direction opposite to the direction of brake actuation, and
the second spring element is further configured such that the force exerted by the second spring element decreases as the friction brake lining moves in the direction of the brake actuation.

11. The friction brake as defined by claim 10, wherein at least one of the first spring element and second spring element engages a component of the ramp mechanism that upon actuation of the friction brake is moved translationally.

12. The friction brake as defined by claim 10, wherein the friction brake has a gear, by way of which one of the first spring element and second spring element having a negative characteristic spring curve engages the friction brake lining.

13. The friction brake as defined by claim 12, wherein the gear has a varying gear ratio.

14. The friction brake as defined by claim 1, wherein:
in a released position of the friction brake, (i) the first spring element is deformed, and (ii) the force exerted by the first spring element is at a minimum, and
moving the friction brake lining from the released position in the direction of the brake actuation (i) reduces deformation of the first spring element, and (ii) increases the force exerted by the first spring element.

15. The friction brake as defined by claim 10, wherein:
in a released position of the friction brake, (i) the first spring element is deformed, and (ii) the force exerted by the first spring element is at a minimum, and
moving the friction brake lining from the released position in the direction of the brake actuation (i) reduces deformation of the first spring element, and (ii) increases the force exerted by the first spring element.

16. The friction brake as defined by claim 15, wherein:
in a released position of the friction brake, (i) the second spring element is deformed, and (ii) the force exerted by the second spring element is at a maximum, and
moving the friction brake lining from the released position in the direction of the brake actuation (i) increases deformation of the second spring element, and (ii) decreases the force exerted by the second spring element.

17. The friction brake as defined by claim 10, wherein, when the friction brake is in a released position, the force exerted by the second spring element in the direction opposite to the direction of brake actuation is greater than the force exerted by the first spring element in the direction of the brake actuation.

18. The friction brake as defined by claim 17, wherein, when the friction brake is in a position in which the friction brake lining is pressed against the brake body, the force exerted by the first spring element in the direction of the brake actuation is greater than the force exerted by the second spring element in the direction opposite to the direction of brake actuation.

* * * * *